United States Patent Office 2,930,801
Patented Mar. 29, 1960

2,930,801

PRODUCTION OF ORGANIC ACIDS FROM ALDEHYDES

Amelio E. Montagna and Leo V. McQuillen, South Charleston, W. Va., assignors to Union Carbide Corporation, a corporation of New York No Drawing. Application June 29, 1954
Serial No. 440,243

30 Claims. (Cl. 260—345.7)

This invention relates to a new and improved method for the production of organic acids, and is a continuation-in-part of U.S. application Ser. No. 393,236, filed November 19, 1953, and now abandoned. More particularly, it concerns the oxidation of aldehydes in a strongly basic medium to produce the salts of carboxylic organic acids from which salts the acids can then be obtained.

It is an object of this invention to provide a commercially feasible process for the production of organic acids. It is a further object of the invention to provide a process wherein the yield of an organic acid from the corresponding aldehyde will be practically quantitative. Other objects and advantages of the invention will be apparent from the description which follows.

Numerous proposals have been made in the past to prepare organic acids from aldehydes by direct oxidation and a number of patents have issued for various techniques. For the most part, these methods have been directed to some specific acid or class of acids, however, and many have had serious drawbacks. For instance, U.S. Patent 2,288,566 shows the oxidation of acrolein to acrylic acid, but the process of this patent is not applicable or practical for industrial usage. The use of weak alkalis or buffered alkalis required in this patent does not result in high yields or long catalyst life. Other U.S. and foreign patents and references relate to the direct oxidation of unsaturated aldehydes to produce the corresponding acids. However, the direct oxidation of unsaturated aldehydes generally leads to the formation of per-compounds, polymerization, decomposition, and other undesirable side-reactions, and the yields of the corresponding acids are substantially less than quantitative.

The process of our invention consists of reacting together an aldehyde, a strong alkali such as sodium hydroxide, and molecular oxygen, in an aqueous medium and in the presence of finely divided silver, and thereby producing an aqueous solution of the alkali salt of the acid corresponding to the aldehyde. This solution is then treated with an acid stronger than the acid being produced, such as sulphuric acid, in order to liberate the acid from its salt. The free acid is then separated and purified by appropriate methods. The molecular oxygen used in the process of the invention may be substantially pure oxygen, as cylinder oxygen, or it may be diluted with nitrogen or other gases as in the form of air.

The process of the invention has the distinct advantage in being of general applicability to the production of practically any carboxylic organic acid or class of acids. By our method almost any such acid can be prepared on a commercially feasible scale and with almost quantitative yields. Thus, both unsaturated and saturated aliphatic acids can be made, the unsaturated acids including sorbic, acrylic, methacrylic, crotonic, 2-ethyl-2-butenoic, 2-hexenoic, 2-methyl-2-pentenoic, 2-octenoic, 2-ethyl-2-hexenoic, 2,4,6-octatrienoic, and 4-pentenoic acids, and the saturated acids including butyric, n-hexanoic, 2-ethylbutyric, 2-ethylhexanoic, 2-ethyloctanoic and 2-butylhexanoic acids. Hydroxy and alkoxy acids which can be made include 3-butoxybutyric, 3,5-diethoxy-hexanoic and 2-ethyl-3-hydroxyhexanoic acids. Dibasic acids can also be made by the process of the invention, among them glutaric, 3-methylglutaric, 2-ethyl-3-methylglutaric, and 2-ethyl glutaric acids. Cyclic unsaturated acids which can be made include $\Delta^3$-tetrahydrobenzoic, $\Delta^3$-tetrahydro-o-toluic, 2,3 - dihydro - 1,4-pyran-2-carboxylic, 2,5-dimethyl-2,3-dihydro-1,4-pyran-2-carboxylic and furoic acids. The complete versatility of the process is shown by the fact that it can also be employed to make aromatic acids, among them benzoic, salicyclic, cinnamic and p-chlorobenzoic acid.

From the above list and from the examples following it can be seen that the method of the invention is adaptable to the production of any organic carboxylic acid which can be isolated in stable form and for which the corresponding aldehyde is available. The apparatus and operating conditions for the practice of the invention are described below. The choice of particular operating conditions for the production of a particular acid can be readily made by one skilled in the art as well as the method of final recovery of the acid from its salt, without departing from the scope of the invention.

In carrying out the process, the aldehyde and the aqueous alkali, the quantity of alkali being slightly in excess of the stoichiometric amount, are added continuously and simultaneously to a vigorously agitated aqueous suspension of the catalyst, while passing molecular oxygen in a form such as air of relatively pure oxygen in excess through the reaction mixture.

The mol ratio or ratio of chemical equivalents of base to aldehyde must be at least one equivalent of base for each equivalent of aldehyde. Generally satisfactory results can be obtained when this ratio is between one and two equivalents of base for each equivalent of aldehyde. The preferred range, however, is between one and 1.2 equivalents of base for each equivalent of aldehyde. The reaction conditions may be varied considerably but it is imperative that conditions be so integrated that the aldehyde is converted to the salt of the corresponding acid almost instantaneously upon addition to the reaction mixture, thereby assuring a high yield of product. It is important that the rate of feed of the aldehyde does not exceed the rate at which it is oxidized, so as to prevent excessive polymerization, aldolization, or other side reaction of the aldehyde. Rates of feed of aldehyde eup to about 8 pounds per hour per gallon of reaction mixture have been used. The most important factors controlling the rate of oxidation, and hence the rate of reaction, are the degree of agitation, the catalyst concentration, the activity of the catalyst, the concenration of molecular oxygen available in the oxidizing gas, the temperature, the pressure, and the reactivity of the aldehyde.

The alkali employed in the invention is a strong unbuffered alkali and the quantity employed is preferably slightly in excess of the amount that is chemically equivalent to the quantity of aldehyde used. Sodium hydroxide, in sufficient quantity to give a pH of about 12.5 or higher in the reaction mixture at all times, is preferred. However, other strong alkalis, including the hydroxides of lithium, potassium and barium may also be used. No matter which alkali is employed it is important for a good yield of product that the pH in the reaction mixture be kept at all times at a value of 12.5 or higher. The concentration of salt in the product is regulated by the amount of water added with the alkali or separately. When using sodium hydroxide as the alkali, any concentration up to about 50 percent by weight of sodium salt may be produced. The preferred concentration is between 15 and 35 percent. Very low concentrations require the processing of excessive amount of product to recover the acid, while concentrations much higher than about 35 percent may result in crystallization. Thus, the alkali may be added to the reaction mixture as an aqueous solution of proper concentration to give the desired concentration of alkali salt in the product, or it may be added in a higher concentration. In the latter case, sufficient additional water must be added separately to the reaction mixture so as to produce an alkali salt of the desired concentration.

The oxidizing agent for the reaction is molecular oxygen which may be in relatively pure form as in cylinder oxygen or mixed with other gases as in air. To promote the required intimate contact, the oxygenating gas is preferably passed through the reaction mixture. It is desirable to use a large excess of molecular oxygen because it is necessary that at all times there be sufficient oxygen present to effect the almost immediate oxidation of the aldehyde.

The catalyst employed in the invention is finely divided silver prepared by chemical reduction of silver compounds. It may be prepared in situ or as a separate operation. When the catalyst is prepared separately, silver oxide, or a mixture of a silver salt such as silver nitrate and an alkali such as sodium hydroxide, is reduced by reaction with an aldehyde and an alkali, or with hydrogen peroxide and an alkali, or with aluminum and an alkali, or by other suitable means. When the catalyst is prepared in situ, silver oxide or a silver salt such as silver nitrate is employed and the action of the aldehyde and the alkali effects the reduction. The silver is preferably present as an aqueous suspension. The minimum concentration of catalyst to be employed is about 1 to 2 percent by weight of the reaction mixture. Preferably the concentration is about 3 to 10 percent, although higher concentrations may be used without adverse effects.

The silver catalyst may be reused repeatedly until it becomes poisoned or fouled. Poisoning and fouling are minimized by using reagents which are essentially free of known catalyst poisons and by operating in such a manner that polymerization, aldolization and other reactions of the aldehyde are held at a minimum. When the catalyst becomes inactive it may be reactivated by washing with organic solvents and inorganic solutions. In extreme cases of poisoning, the spent catalyst can be redissolved in nitric acid, the silver nitrate purified, and new catalyst prepared from it.

A reactor suitable for the invention must be designed for intimate and rapid contact of the five major components of the reaction mixture which are the aldehyde, the alkali, the solid silver catalyst, the oxygenating gas, and the aqueous salt produced. Vigorous mechanical agitation is desirable, although other methods of agitation may be used provided they furnish the required contact. Provision must be made for maintaining a temperature of from 0° C. to about 100° C., with the preferred temperature range for the invention being from about 20° C. to about 80° C. Pressures ranging from atmospheric to 150 pounds per square inch gauge have been employed in the invention, and even higher pressures, in excess of 200 pounds per square inch, could be used and would be suitable and advantageous. One of the factors controlling the rate of reaction is the partial pressure of oxygen in the system; hence, when using air it is necessary to operate at a higher pressure than when using pure oxygen, in order to obtain the same given result.

The process may be carried out batchwise or continuously. Because the conversion of the aldehyde is practically instantaneous, the process is readily adapted for continuous, single-pass operation. In the preferred continuous operation, the product salt solution produced is continuously withdrawn from the reactor by means of an internal filter immersed in the reaction mixture. The use of the filter eliminates the necessity of recycling the catalyst. However, removing the catalyst from the reactor and continuously recycling it is entirely feasible and within the scope of the invention.

As a final step, after the oxidation reaction has been performed, the product acid is liberated from its salt by the addition of a stronger acid. Sulphuric acid is quite suitable, but other acids that may be used include hydrochloric, nitric and phosphoric. Water-soluble organic acids, such as formic and acetic acids, may also be used to liberate weaker or water-insoluble acids. After liberation, the product acid is separated and refined by any suitable means consistent with its properties. The choice of the recovery method to be applied in the case of a particular acid will be within the scope of one skilled in the art.

In general, the method of separation to be used will depend upon the reaction which occurs when a stronger acid is added to the filtered product solution resulting from removal of the catalyst. Many product acids are precipitated by this acid addition and their recovery is relatively simple. Filtration of the precipitated acid followed by washing may suffice. However, the acid may not be completely precipitated and it may be necessary to employ solvent extraction, distillation, or other means to recover the remainder. Some product acids form a homogeneous solution when the liberating acid is added and such means as solvent extraction and distillation are necessary for recovery. Still other product acids form a separate layer when the liberating acid is added and may be roughly separated by merely decanting the layer of product acid, in which case more complete recovery is usually had by applying conventional separation techniques to the remaining solution. Regardless of the method of separation employed it is often necessary or desirable to further refine and purify the product acid by one or more conventional means such as washing, solvent extraction, recrystallization, filtration, distillation, steam distillation, etc. Numerous separation techniques and combinations of techniques as applied to particular acids are illustrated in the examples below.

HEXADIENAL.—EXAMPLES I–V

*Example I*

Twenty grams of silver catalyst, prepared by reducing silver oxide with hydrogen peroxide and sodium hydroxide, together with 200 grams of water, was added to one-liter flask equipped with a motor-driven, propeller type stirrer. Agitation was begun and oxygen was continuously added through a sintered glass diffuser immersed in the liquid. By means of a water bath around the flask the temperature was then adjusted to 25° C., and was held between 25° and 31° C. throughout the reaction. Ninety-six grams (1 mol) of hexadienal was added continually at the rate of 53–54 grams per hour. Concurrently 41.2 grams (1.03 mols) of sodium hydroxide in a 19 percent aqueous solution was added continually at such a rate that the mol ratio of the quantity of sodium hydroxide added during any unit of time to the quantity of hexadienal added during the same unit of time was about 1.03 to 1, and always at least 1 to 1, and the pH of the reaction mixture was always above 12.5. Vigorous agitation was continued throughout the reaction period and the quantity of oxygen added was always in excess of that consumed in the reaction.

After completion of the reaction the catalyst was filtered out and then washed with distilled water, the washings being added to the filtrate. A slight excess of sulphuric acid was then added to the solution, forming a precipitate which was filtered out and then recrystallized from hot water, yielding 78.5 grams (a 70 percent yield) of 99.8 percent pure refined crystals of the high-melting (134.5° C.) isomer of sorbic acid. Extraction, with di-isopropyl ether, of the mother liquor from the acidification with sulphuric acid and of the water of recrystallization, and further processing of this extract, gave an additional 16 grams (14 percent yield) of the high-melting isomer and 14.5 grams (13 percent yield) of the low-melting (approximately 32° C.) isomer of sorbic acid. Thus, the total yield of sorbic acid was 97 percent, of which 84 percent was the high-melting isomer and 13 percent was the low-melting isomer.

*Example II*

The reactor used consisted of a three-gallon stainless steel autoclave designed for continuous operation at super-atmospheric pressure. It was equipped with a motor-driven turbine-type stirrer, an inlet for oxidizing gas at the bottom, automatic controls for regulating temperature, pressure, gas flow and liquid level, and a filter in the reaction zone connected to a product outlet. Two gallons of water and 1.3 pounds of silver catalyst were added to the reactor. Agitation was begun, the temperature was adjusted to 30° C., being held at 25° C. to 33° C. throughout the reaction, and oxygen gas was added until the pressure reached 150 pounds per square inch gauge. Continuous addition of 66 pounds of hexadienal was then begun at a rate of about 3 pounds per hour. Concurrently twenty percent sodium hydroxide aqueous solution was added continuously in slight molar excess of the quantity of hexadienal added, so as to give a product containing from 0.5 to 1.0 percent by weight of free sodium hydroxide, and maintain the pH of the reaction mixture above 13. Sufficient distilled water was continuously added so as to give a product containing about 18 percent by weight of sodium sorbate. During the entire process the pressure was held at 150 pounds per square inch gauge by the continuous addition of oxygen, the reaction mixture was agitated vigorously and a liquid level of 2 gallons was maintained in the reactor through control of the rate at which product was removed. Twenty four hours of operation produced 506 pounds of aqueous solution containing 17.7 percent by weight of sodium sorbate, a total of 89.6 pounds of contained sodium sorbate for a 97 percent yield.

*Example III*

In the run of this example the reactor used was the same as that for Example II and the method of operation was generally the same, with the following operation conditions. A temperature of 65° to 68° C., a pressure of 150 pounds per square inch gauge and a liquid level of 2 gallons in the reactor were maintained throughout the reaction. The feed rate of hexadienal was started at about 5 pounds per hour and gradually increased to about 14 pounds per hour; a total of 223 pounds of hexadienal was added during the 26 hours of operation. Sufficient fifty percent sodium hydroxide aqueous solution was continuously added so as to give a 0.5 to 1.0 percent concentration of free sodium hydroxide in the product, and maintain a pH in the reaction mixture above 13. Sufficient distilled water was continuously added to make the concentration of sodium sorbate in the product about 17 percent. Total product was 1796 pounds of aqueous solution containing 304 pounds of sodium sorbate, for a yield of 98 percent.

*Example IV*

For the run of this example the reactor used was similar to that used in Example II but had a volume of 30 gallons and was equipped for operation with air, with provision for blowing off excess gas. The reactor was charged with 20 gallons of water and 13 pounds of silver catalyst, and a liquid level in the reactor between 17 and 18 gallons was maintained throughout the reaction. Compressed air was used as the oxidizing gas and a pressure of about 75 pounds per square inch gauge was maintained during the reaction, with an air flow rate of 600 standard cubic feet per hour. Throughout the reaction the temperature was held at 46° to 54° C. During a 360 hour reaction period, 8,300 pounds of hexadienal was added at the rate of about 23 pounds per hour. Sufficient fifty percent sodium hydroxide aqueous solution was continuously added so as to give a concentration of free sodium hydroxide in the product of about one per cent, and maintain a pH in the reaction mixture above 13. Sufficient distilled water was continuously added to make the concentration of sodium sorbate in the product between 18 and 19 percent. Total product was 57,930 pounds of aqueous solution containing 10,640 pounds of sodium sorbate, for a yield of 92 percent.

*Example V*

The reactor used in this example was the same three-gallon stainless steel autoclave used for Example II, and the manner of operation was the same as in Example II except that the reactor was vented to the atmosphere. An excess of oxygen was provided throughout the run by continuously adding an amount of oxygen sufficient to maintain a constant positive flow out of the reactor to the atmosphere. The following operating conditions were used. A temperature of 34° to 41° C., a pressure of 0 pound per square inch gauge and a liquid level of 2 gallons in the reactor were maintained throughout the run. During the 55 hour run a total of 64.6 pounds (0.672 pound mol) of 2,4-hexadienal was added at the rate of about one pound per hour. The concentration of sodium sorbate was maintained at about 13 percent and the concentration of free sodium hydroxide at from 0.6 to 1.4 percent. Total product was 661 pounds of aqueous solution containing 88.2 pounds (0.657 pound mol) of sodium sorbate, a yield of 98 percent.

ACROLEIN.—EXAMPLES VI–IX

*Example VI*

Twenty grams of silver catalyst together with 200 grams of water was added to a one liter flask equipped with a motor-driven, propeller type stirrer. Agitation was begun and oxygen was continuously added through a sintered glass diffuser immersed in the liquid. The temperature within the flask was maintained between 25° and 35° C. throughout the reaction by means of a water bath surrounding the flask. Fifty-six grams of acrolein having a purity of 98 percent (0.98 mol) was added continuously at the rate of 30 to 40 milliliters per hour. Concurrently 236 grams (1.00 mol) of sodium hydroxide in a 17 percent solution was added continually at such a rate that the mol ratio of the quantity of sodium hydroxide to the quantity of acrolein was always 1.02 to 1 or higher. Vigorous agitation was continued throughout the reaction and the quantity of oxygen added was in excess of that consumed in the reaction. After completion of the reaction the catalyst was filtered out and then washed with distilled water, the washings being added to the filtrate. This filtered product solution amounted to 538 grams and contained 15.0 percent of sodium acrylate (0.89 mol). Thus, the yield of contained sodium acrylate was 91 percent based on acrolein.

*Example VII*

The apparatus and procedure were the same as in Example VI, with the following charge and operating conditions. The charge consisted of 300 grams of water and 44 grams of silver catalyst. The reaction temperature throughout the reaction was maintained at 0 to 10° C. Fifty-six grams of 98 percent acrolein (0.98 mol) diluted to 313 milliliters with water was added continuously at a constant rate of 100 milliliters per hour. Concurrently 158 grams of barium hydroxide octahydrate (0.501 mol) diluted to 470 milliliters with water was added at such a rate that the mol ratio of barium hydroxide to acrolein was always 0.51 to 1 or higher.

After removal of the catalyst, the clear colorless filtered product solution amounted to 1070 milliliters and contained 133.5 grams of barium acrylate (0.477 mol) for a yield of 97 percent based on acrolein.

Example VIII

The reactor used consisted of a three gallon stainless steel autoclave designed for continuous operation at superatmospheric pressure. It was equipped with a motor-driven, turbine type stirrer, an inlet for oxidizing gas (in this example air was used) at the bottom; automatic controls for regulating the temperature, pressure, gas flow and liquid level, and a filter in the reaction zone connected to a product outlet. Two gallons of water and 1.3 pounds of silver catalyst were charged to the reactor. Agitation was begun, and the temperature was adjusted to 30° C., at about which figure it was held throughout the reaction. Compressed air was used as the oxidizing gas and a pressure of 75 pounds per square inch gauge was maintained during the reaction, with an air flow rate of between 50 and 60 standard cubic feet per hour. The system was operated for a period of 24 hours to attain equilibrium and then for an additional period of 121 hours. During the latter period 52.8 pounds of acrolein of 92 percent purity (0.87 pound mol) was added at the rate of 0.3 to 0.5 pounds per hour. Concurrently, sufficient sodium hydroxide in 20 percent aqueous solution was added so as to maintain the concentration of free sodium hydroxide in the product at between 0.7 and 0.9 percent and sufficient distilled water was continually added so as to maintain the concentration of sodium acrylate in the product at about 18 percent. During the 121 hour period the product solution obtained amounted to 401 pounds and contained 71.7 pounds (0.76 pound mol) of sodium acrylate for a yield of 87 percent based on acrolein.

Example IX

The reactor, the procedure, and the initial charge were the same as those used in Example VIII. The reaction conditions were as follows: temperature of 30° C., pressure of 150 pounds per square inch gauge, air flow rate of 55 to 70 standard cubic feet per hour, liquid level of 2 gallons, rate of feed of acrolein of about 0.5 pound per hour, concentration of sodium acrylate in the product solution of about 17 percent, and concentration of free sodium hydroxide in the product of 0.9 to 1.1 percent. The system was operated for a period of 11 hours to attain equilibrium and then for an additional period of 160 hours. During the 160 hour period, a total of 76.2 pounds of 92 percent pure acrolein (1.25 pound mol) was added, and the product amounted to 629 pounds of aqueous solution containing 106.7 pounds (1.135 pound mol) of sodium acrylate, for a yield of 91 percent.

A portion of the product solution, containing 4510 grams of sodium acrylate (48 mols) was acidified with an excess of concentrated sulfuric acid. The resultant solution was extracted repeatedly with diisopropyl ether. This extract was inhibited with about 0.25 percent of hydroquinone and was fractionally distilled, first at atmospheric pressure to recover the diisopropyl ether, and then under vacuum to recover the acrylic acid. There was obtained 2860 grams (39.7 mols) of glacial acrylic acid which distilled at a temperature of 40 to 42° C. at 10 millimeters of mercury. The acid had the following properties: specific gravity, 1.005 at 20/20° C.; freezing point, 12° C.; purity by determination of acidity, 98.7 percent; purity by determination of ethylenic unsaturation, 97.1 percent. The recovery of glacial acrylic acid was 83 percent based on the amount of sodium acrylate used.

Examples X through XLI

In the following examples, Nos. X through XLI, the following apparatus and procedure were common to all. The reaction vessel consisted of a one, three or five liter round bottom flask, equipped with a motor-driven, propeller type stirrer. Agitation was begun, after the addition of water and catalyst, and the oxidizing gas was continuously added through a sintered glass diffuser immersed in the liquid. The temperature was controlled by means of a water bath around the flask. Vigorous agitation was continued throughout the reaction period and the quantity of oxygen added was always in excess of that consumed in the reaction. After completion of the reaction the catalyst was filtered out leaving a filtered product solution.

The materials used and the procedures which varied are given under the individual examples below.

OTHER UNSATURATED ALDEHYDES.—EXAMPLES X–XVIII

Example X

The charge consisted of 500 grams of water and 66 grams of silver catalyst. Two hundred eighteen grams of methacrolein having a purity of 99.3 percent (3.09 mols) was added continuously at a constant rate of about 70 milliliters per hour. Concurrently 908 grams of 14 percent aqueous sodium hydroxide solution (3.18 mols) was added at such a rate that the mol ratio of sodium hydroxide to methacrolein was always 1.03 to 1 or higher. The reaction temperature was maintained between 23° and 29° C. The filtered product solution of sodium methacrylate was acidified with a slight excess of sulfuric acid and was then extracted with diisopropyl ether. The extract contained 265 grams of methacrylic acid (3.08 mols) for a yield of 99.6 percent based on the methacrolein. This extract was fractionally distilled in the presence of hydroquinone resulting in a 95 percent recovery of methacrylic acid having a purity of 99.6 percent by determination of acidity, a specific gravity of 1.018 at 20/20° C., a boiling point of 59° C. at 10 millimeters of mercury, and a freezing point of 14° C.

Example XI

The charge consisted of 500 grams of water and 60 grams of silver catalyst. Two hundred and fifty-nine grams of water-saturated crotonaldehyde having a purity of 89.5 percent (3.31 mols) was added continuously at a rate of about 60 to 80 milliliters per hour. Concurrently 586 grams of 24 percent aqueous sodium hydroxide solution (3.52 mols) was added at such a rate that the mol ratio of sodium hydroxide to crotonaldehyde was always 1.06 to 1 or higher. The reaction temperature was maintained between 25° and 35° C. The filtered product solution of sodium crotonate was steam distilled to remove volatile impurities and was then acidified with a slight excess of sulphuric acid. The mixture was chilled to a temperature of 0° C., and the precipitate was filtered and dried. The white, crystalline product amounted to 180 grams of crotonic acid having a purity (acidity) of 99.8 percent (2.09 mols), melting point of 72° C., corresponding to a yield of 63 percent based on the aldehyde. The filtrate was extracted repeatedly with diisopropyl ether. After removal of the ether by distillation, an additional 39 grams of crotonic acid (0.45 mol) was recovered (14 percent yield) and, in addition, 30 grams (0.35 mol) of iso-crotonic acid, melting point of 14° C. (11 percent yield). Thus the overall yield of crotonic acid was 88 percent, base on the aldehyde, 77 percent being crotonic acid and 11 percent iso-crotonic acid.

Example XII

The charge consisted of 500 grams of water and 60 grams of silver catalyst. Two hundred and ninety-four grams of 2-ethylcrotonaldehyde (3.00 mols) was added continuously at a constant rate of about 40 to 60 milliliters per hour. Concurrently 834 grams of 15 percent aqueous sodium hydroxide solution (3.13 mols) was added at such a rate that the mol ratio of sodium hydroxide to aldehyde was always 1.04 to 1 or higher. The reaction temperature was maintained between 30° and 35° C. The filtered product solution of sodium 2-ethylcrotonate was steam distilled to remove volatile impurities, and was then acidified with a slight excess of sulfuric acid. The acidified product was extracted with diisopropyl ether. A total of 1700 milliliters of extract was obtained containing 291 grams of 2-ethylcrotonic acid (2.55 mols) for a yield of 85 percent based on 2-ethylcrotonaldehyde. After removing the ether, the residue was the 2-ethylcrotonic acid as a crystalline solid having a purity of 98 percent by determination of acidity and a purity of 98.8 percent by determination of ethylenic unsaturation.

*Example XIII*

The charge consisted of 500 grams of water and 60 grams of silver catalyst. Three hundred grams of 2-hexenal having a purity of 98 percent (3.00 mols) was added continuously at a constant rate of about 60 milliliters per hour. Concurrently 834 grams of 15 percent aqueous sodium hydroxide solution (3.13 mols) was added at such a rate that the mol ratio of sodium hydroxide to aldehyde was always 1.04 to 1 or higher. The reaction temperature was maintained between 30° and 40° C. The filtered product solution of sodium 2-hexenoate was steam-distilled to remove volatile impurities, and then was acidified with a slight excess of sulfuric acid. The resulting layers were separated. The lower aqueous layer was steam-distilled to recover the contained 2-hexenoic acid. The upper acid layer from the acidification was combined with the acid recovered by the steam-distillation of the aqueous layer. A total of 340 grams of crude 2-hexenoic acid having a purity of 94.9 percent (2.83 mols) was obtained corresponding to a yield of 94 percent based on the aldehyde. The crude acid was refined by vacuum distillation to yield refined 2-hexenoic acid having a purity (acidity) of 99.2 percent. The refined acid had a boiling point of 215° C. at 760 millimeters of mercury, and a specific gravity of 0.967 at 20/20° C.

*Example XIV*

The charge consisted of 500 grams of water and 60 grams of silver catalyst. Two hundred and ninety-four grams of 2-methyl-2-pentenal (3.00 mols) was added continuously at a constant rate of about 60 milliliters per hour. Concurrently 15 percent aqueous sodium hydroxide solution was added at such a rate that the mol ratio of sodium hydroxide to 2-methyl-2-pentenal was always 1.04 to 1 or higher. The reaction temperature was maintained between 35° and 40° C. The filtered product solution of sodium 2-methyl-2-pentenoate was processed as in Example XIII. A total of 318 grams of crude 2-methyl-2-pentenoic acid, purity 98.4 percent (2.74 mols), was obtained corresponding to a yield of 91 percent based on the aldehyde. The crude acid was refined by vacuum distillation giving refined product having a purity (acidity) of 99.2 percent. The refined acid had a boiling point of 210° C. at 760 millimeters of mercury, and of 80° C. at 1 millimeter of mercury. Its specific gravity was 0.984 at 20/20° C.

*Example XV*

The charge consisted of 500 grams of water and 40 grams of silver catalyst. One hundred and eighty-nine grams of 2-octenal (1.50 mols) was added continuously at a constant rate of about 60 milliliters per hour. Concurrently 20 percent aqueous sodium hydroxide solution was added at such a rate that the mol ratio of sodium hydroxide to 2-octenal was always 1.04 to 1 or higher. The reaction temperature was maintained between 30° C. and 40° C. The filtered product solution of sodium 2-octenoate was processed as in Example XIII. A total of 213 grams of crude 2-octenoic acid having a purity of 97 percent (1.45 mols) was obtained, corresponding to a yield of 97 percent based on the aldehyde. The crude acid was refined by vacuum distillation to yield refined 2-octenoic acid having a purity of 99.0 percent by determination of acidity and 99.1 percent by determination of ethylenic unsaturation. The refined acid had an ASTM distillation range of 235 to 240° C. at 760 millimeters of mercury and a specific gravity of 0.940 at 20/20° C.

*Example XVI*

The charge consisted of 500 grams of water and 112 grams of silver catalyst. Six hundred and thirty grams of 2-ethyl-2-hexenal having a purity of 99.2 percent (4.95 mols) was added continuously at a constant rate of about 152 grams per hour. Concurrently 12.5 percent aqueous sodium hydroxide was added at such a rate that the mol ratio of sodium hydroxide to 2-ethyl-2-hexenal was 1.06 to 1 throughout the reaction period. The reaction temperature was maintained between 36° and 41° C. The filtered product solution of sodium 2-ethyl-2-hexenoate was processed as in Example XIII. The crude 2-ethyl-2-hexenoic acid was obtained as an oil layer amounting to 683 grams and had a purity of 97.8 percent (4.70 mols), for a yield of 95 percent based on the starting aldehyde. Refined 2-ethyl-2-hexenoic acid was obtained from the crude acid by a single distillation with a recovery greater than 90 percent. The refined product was characterized by the following properties: purity by determination of acidity, 99.0 percent; purity by determination of ethylenic unsaturation, 100.6 percent; ASTM distillation range, 234 to 241° C. at 760 millimeters of mercury; color, 20 Platinum-Cobalt; and specific gravity, 0.9475 at 20/20° C.

*Example XVII*

The charge consisted of 1000 grams of water and 56 grams of silver catalyst. One hundred and eighty-eight grams (1.54 mols) of a mixture of 8-carbon unsaturated aldehydes representing a byproduct fraction from the production of crotonaldehyde from acetaldehyde, and containing an unknown amount of 2,4,6-octatrienal was added continuously at a constant rate of about 44 grams per hour. Concurrently a sufficient quantity of 25 percent aqueous sodium hydroxide was added at such a rate that the mol ratio of sodium hydroxide to aldehyde was 1.03 to 1 throughout the reaction period. The reaction temperature was maintained between 28° and 33° C. The filtered product solution weighed 1605 grams, including 200 grams of catalyst-wash water. An aliquot of 1220 grams of the product solution was acidified with a slight excess of sulfuric acid. A dark yellow precipitate formed and was recovered by filtration. The crude acid was recrystallized from a mixture of 1,4-dioxane and water and dried to recover refined 2,4,6-octatrienoic acid, weighing 35 grams (0.25 mol) which had a melting point of 169 to 171° C. and a purity (acidity) of 99.5 percent. The refined acid represented a yield of 21 percent based on the starting mixture of aldehydes.

*Example XVIII*

The charge consisted of 600 grams of water and 56 grams of silver catalyst. One hundred and ninety-four grams of 4-pentenal having a purity of 97.5 percent (2.25 mols) was added continuously at a constant rate of about 45 grams per hour. Concurrently 18 percent aqueous sodium hydroxide was added at such a rate that the mol ratio of sodium hydroxide to 4-pentenal was 1.1 to 1 throughout the reaction. The reaction temperature was maintained between 36° and 42° C. The product solution of sodium 4-pentenoate was acidified with a slight excess of sulfuric acid. An oil layer of 221 grams of crude 4-pentenoic acid was obtained having a purity of 78.2 percent (1.73 mols). An additional 43.2 grams (0.43 mol) of contained 4-pentenoic acid was obtained by extraction of the aqueous layer with diisopropyl ether. The yield of crude acid was 96 percent based on the starting aldehyde. The crude 4-pentenoic acid, including the acid recovered in the ether extract, was refined by distillation. The refined fraction, weighing 200 grams, was taken at a vapor temperature of 82° C. at 10 millimeters of mercury. The refined 4-pentenoic acid, having a purity of 99.1 percent by acidity and a specific gravity of 0.974 at 28/15.6° C., represented an overall yield of 88 percent based on the starting aldehyde.

SATURATED ALDEHYDES.—EXAMPLES XIX–XXVIII

Example XIX

The charge consisted of 600 grams of water and 70 grams of silver catalyst. Two hundred and sixteen grams of butyraldehyde having a purity of 98.9 percent (2.96 mols) was added continuously at a constant rate of about 60 milliliters per hour. Concurrently 13 percent aqueous sodium hydroxide solution was added at such a rate that the mol ratio of sodium hydroxide to butyraldehyde was 1.03 to 1 or higher throughout. The reaction temperature was maintained between 15° and 20° C. The filtered product solution of sodium butyrate was acidified with a slight excess of sulfuric acid and then was extracted with diisopropyl ether. The contained butyric acid was 260 grams (2.95 mols), for a yield of 99.7 percent based on the aldehyde. The extract was refined by vacuum distillation to yield refined butyric acid having a purity of 99.8 percent, a specific gravity of 0.9590 at 20/20° C., an ASTM distillation range of 162.1 to 164.8° C., and a color of 3 Platinum-Cobalt.

Example XX

The charge consisted of 500 grams of water and 70 grams of silver catalyst. Four hundred and one grams of n-hexaldehyde having a purity of 91.2 percent (3.65 mols) was added continuously at a constant rate of about 70 milliliters per hour. Concurrently 19 percent aqueous sodium hydroxide solution was added at such a rate that the mol ratio of sodium hydroxide to n-hexaldehyde was 1.15 to 1 throughout the reaction. The reaction temperature was maintained between 17 and 23° C. The filtered product solution of sodium hexanoate was steam-distilled to remove volatile impurities and was then acidified with a slight excess of sulfuric acid. The lower aqueous layer was steam-distilled to remove the contained n-hexanoic acid. The upper layer of the acidified solution was combined with the acid recovered by the steam-distillation of the aqueous layer. The crude acid amounted to 450 grams and had a purity of 94 percent (3.64 mols) for a yield of 99.7 percent based on the aldehyde. The crude acid was distilled to recover refined n-hexanoic acid having a purity of 100.0 percent, a specific gravity of 0.9275 at 20/20° C., a color of 10 Platinum-Cobalt, and an ASTM distillation range of 204.0 to 209.2° C. at 760 millimeters of mercury.

Example XXI

The charge consisted of 500 grams of water and 70 grams of silver catalyst. Four hundred and one grams of 2-ethylbutyraldehyde having a purity of 93.7 percent (3.75 mols) was added continuously at a constant rate of about 70 milliliters per hour. Concurrently 19 percent aqueous sodium hydroxide solution was added at such a rate that the mol ratio of sodium hydroxide to 2-ethylbutyraldehyde was 1.12 to 1 or higher. The reaction temperature was maintained between 25° and 40° C. The filtered product solution of sodium 2-ethylbutyrate was processed as in Example XX. The total crude acid amounted to 453 grams having a purity of 95.5 percent (3.73 mols), a yield of crude acid of 99.4 percent based on the aldehyde. The crude acid was refined by vacuum distillation. The refined 2-ethylbutyric acid had a purity of 100.0 percent, a specific gravity of 0.9236 at 20/20° C., an ASTM distillation range of 194.2 to 195.6° C. at 760 millimeters of mercury, and a color of 3 Platinum-Cobalt.

Example XXII

The charge consisted of 500 cubic centimeters of water and 80 grams of silver catalyst. Five hundred and thirteen grams of 2-ethylhexaldehyde having a purity of 95.3 percent (3.81 mols) was added continuously at a constant rate of about 80 to 100 milliliters per hour. Concurrently 15 percent aqueous sodium hydroxide solution was added at such a rate that the mol ratio of sodium hydroxide to 2-ethylhexaldehyde was 1.1 to 1 throughout the reaction. The reaction temperature was maintained between 20° and 30° C. The filtered product solution of sodium 2-ethylhexanoate was processed as in Example XX. The crude acid amounted to 558 grams and had a purity of 98.6 percent (3.81 mols) for a yield of 100 percent based on the aldehyde. The crude acid was refined by vacuum distillation to yield refined 2-ethylhexanoic acid having a purity of 100.0 percent, a specific gravity of 0.9070 at 20/20° C., an ASTM distillation range of 225.5 to 233.0° C., and a color of 5 Platinum-Cobalt.

Example XXIII

The charge consisted of 200 grams of water and 20 grams of silver catalyst. Seventy-eight grams of 2-ethyloctaldehyde (0.50 mol) was added continuously at a constant rate of about 60 to 80 milliliters per hour. Concurrently 20 percent aqueous sodium hydroxide solution was added at such a rate that the mol ratio of sodium hydroxide to 2-ethyloctaldehyde was always 1.14 to 1 or higher. The reaction temperature was maintained between 25° and 35° C. The filtered product solution of sodium 2-ethyloctanoate was processed as in Example XX. The crude 2-ethyloctanoic acid amounted to 74 grams having a purity of 97 percent (0.417 mol) for a yield of 83 percent based on the aldehyde. The crude acid was refined by vacuum distillation to yield 70 grams of 2-ethyloctanoic acid having a purity (acidity) of 100.4 percent, a specific gravity of 0.8975 at 20/20° C., a refractive index of 1.4321 ($n$ 20/D), and an ASTM distillation range of 240 to 261° C.

Example XXIV

The charge consisted of 500 grams of water and 60 grams of silver catalyst. Three hundred and twelve grams of an aldehyde-alcohol mixture containing 68 percent (1.36 mols) of a mixture of 2-ethyloctaldehyde and 2-butylhexaldehyde was added continuously at a constant rate of about 60 to 80 milliliters per hour. Concurrently 13.5 percent aqueous sodium hydroxide solution was added at such a rate that the mol ratio of sodium hydroxide to contained aldehyde was always 1.3 to 1 or higher. The reaction temperature was maintained between 25° and 35° C. The filtered product solution of the sodium salts of the 10-carbon acids was processed as in Example XX. The crude acid amounted to 204 grams, purity 99 percent (1.17 mols) for a yield of 86 percent based on the aldehydes. The crude acid was refined by vacuum distillation to yield a mixture of 2-ethyloctanoic acid and 2-butylhexanoic acid having a combined purity (acidity) of 99.1 percent, a specific gravity of 0.898 at 20/20° C., and an ASTM distillation range of 253° to 263° C.

Example XXV

The charge consisted of 250 grams of water and 80 grams of silver catalyst. Five hundred and seventy-six grams of 3-butoxybutyraldehyde having a purity of 97.1 percent (3.88 mols) was added at a constant rate of about 80 to 100 milliliters per hour. Concurrently 15 percent aqueous sodium hydroxide solution was added at such a rate that the mol ratio of sodium hydroxide to 3-butoxybutyraldehyde was 1.08 to 1. The reaction temperature was maintained between 25° and 30° C. The filtered product solution of sodium 3-butoxybutyrate was processed as in Example XX. The crude 3-butoxybutyric acid amounted to 614 grams, purity 90.4 percent (3.46 mols), which corresponded to a yield of 89 percent based on the aldehyde. There was also obtained a small amount of crotonic acid. The crude acid was refined by distillation to yield refined 3-butoxybutyric acid having a purity (acidity) of 99.0 percent. The refined acid had a boiling point of 242° C. at 760 millimeters of mercury and of 93° C. at 1 millimeter of mercury, a specific gravity of 0.9630 at 20/20° C., and a color of 5 Platinum-Cobalt.

*Example XXVI*

The charge consisted of 500 grams of water and 67 grams of silver catalyst. Three hundred and sixty-eight grams of 3,5-diethoxyhexaldehyde having a purity of 95 percent (1.86 mols) was added continuously at a constant rate of 92 grams per hour. Concurrently 9 percent aqueous sodium hydroxide was added at such a rate that the mol ratio of sodium hydroxide to 3,5-diethoxyhexaldehyde was 1.1 to 1 throughout the reaction. The reaction temperature was maintained between 30° and 32° C. The filtered product solution was acidified with a slight excess of sulfuric acid. Crude 3,5-diethoxyhexanoic acid, amounting to 342 grams and having a purity of 84.3 percent (1.41 mols), was collected as an insoluble oil layer. An additional 81 grams (0.40 mol) of contained 3,5-diethoxyhexanoic acid was recovered from the aqueous layer by extraction with 2-ethylhexanol. The total yield of crude 3,5-diethoxyhexanoic acid was 97 percent based on the starting aldehyde. Fractional distillation of the crude acid gave refined 3,5-diethoxyhexanoic acid boiling at 115° to 120° C. at 1 millimeter of mercury and having a purity (acidity) of 98 percent and a specific gravity of 1.005 at 20/15.6° C.

*Example XXVII*

The charge consisted of 600 grams of water and 50 grams of silver catalyst. Two hundred and thirty-two grams of refined butyraldol (2-ethyl-3-hydroxyhexaldehyde) (1.61 mols) was added continuously at a constant rate of 37 grams per hour. Concurrently 539 grams of 7.8 percent aqueous lithium hydroxide (1.755 mols) was added at such a rate that the mol ratio of lithium hydroxide to butyraldol was 1.09 to 1 throughout the reaction period. The reaction temperature was maintained between 9° and 12° C. The filtered product weighed 1467 grams including 100 grams of catalyst-wash water. The free alkalinity of the solution was 0.35 percent lithium hydroxide, and the concentration of salts was 17.4 percent, calculated as lithium 2-ethyl-3-hydroxyhexanoate (255 grams equals 1.535 mols), a yield of 95 percent based on the butyraldol.

*Example XXVIII*

The charge consisted of 600 grams of distilled water and 50 grams of silver catalyst. Two hundred and thirty-two grams of butyraldol (2-ethyl-3-hydroxyhexaldehyde) of 91.9 percent purity (1.48 mols) was continuously added at a constant rate of 62 grams per hour. Concurrently 644 grams of 11.96 percent aqueous sodium hydroxide (1.92 mols) was added at such a rate that the free alkalinity in the reaction mixture was 0.5 to 1.0 percent of sodium hydroxide throughout the reaction period. The reaction temperature was maintained between 32° and 36° C. The filtered product solution, weighing 1554 grams and having a free alkalinity of 0.69 percent of sodium hydroxide, was acidified with a slight excess of sulfuric acid. An oil layer was obtained weighing 237 grams and containing 55.3 percent of 2-ethyl-3-hydroxyhexanoic acid (0.82 mol). An additional 34.4 grams (0.21 mol) of contained 2-ethyl-3-hydroxyhexanoic acid was obtained by extraction of the aqueous layer with diisopropyl ether. The total yield of 2-ethyl-3-hydroxyhexanoic acid was 70 percent based on the starting butyraldol. Other acids obtained in the oxidation and their yields based on butyraldol were: 2-ethyl-2-hexanoic acid, 11 percent; and butyric acid, 10 percent; thus, the total yield of acids was 91 percent. The crude mixture of acids was refined by distillation. The 2-ethyl-3-hydroxyhexanoic acid was a viscous liquid boiling at 125° C., at 3 millimeters of mercury. It had a purity of 99.2 percent by determination of acidity and of 97.5 percent by determination of the hydroxyl groups. Its specific gravity was 1.025 at 20/20° C.

DIALDEHYDES.—EXAMPLES XXIX–XXXXII

*Example XXIX*

The charge consisted of 350 grams of water and 54 grams of silver catalyst. Four hundred and eighty-five grams of aqueous glutaraldehyde solution having a purity of 26.4 percent (1.28 mols) was added continuously at a constant rate of 29 grams of contained aldehyde per hour. Concurrently 20 percent aqueous sodium hydroxide was added at such a rate that the mol ratio of sodium hydroxide to glutaraldehyde was 2.1 to 1 throughout the reaction. The reaction temperature was maintained between 28° and 31° C. The filtered product solution of disodium glutarate was acidified with a slight excess of sulfuric acid. The resulting homogeneous solution was evaporated to dryness at reduced pressure with a maximum kettle temperature of 55° C. The resulting solids were extracted with diisopropyl ether. The ether was subsequently removed and 157 grams of crude glutaric acid having a purity (acidity) of 93.1 percent (1.105 mols) was obtained. The crude acid melted at 90° to 93° C. and represented a yield of contained acid of 86 percent based on the starting aldehyde. The crude glutaric acid was refined by recrystallization from benzene to a 97.5 percent purity and a melting point of 94° to 96° C.

*Example XXX*

The charge consisted of 735 grams of water and 66 grams of silver catalyst. Three hundred and ninety-seven grams of aqueous 3-methylglutaraldehyde having a purity of 47.5 percent (1.65 mols) was added continuously at a constant rate of 40 grams of contained aldehyde per hour. Concurrently 29 percent aqueous sodium hydroxide was added at such a rate that the mol ratio of sodium hydroxide to 3-methylglutaraldehyde was 2.1 to 1 throughout the reaction period. The reaction temperature was maintained between 56° and 60° C. The filtered product solution weighed 1819 grams, including 250 grams of catalyst-wash water, and contained 289 grams (1.52 mols) of disodium 3-methylglutarate, a yield of 92 percent, based on the aldehyde. The solution was acidified with a slight excess of sulfuric acid. The resulting homogeneous solution weighed 1926 grams. A 1500 gram aliquot of the acidified solution was extracted with ethylene glycol diethyl ether. The extract was distilled to remove the contained water and solvent. To the hot kettle residue was added 500 milliliters of benzene. The solution was cooled 3-methylglutaric acid precipitated from the benzene solution. The acid was filtered and dried. The 3-methylglutaric acid product weighed 155 grams, had a purity (acidity) of 97.9 percent (1.04 mols) and represented a yield of 81 percent based on the starting aldehyde. The melting point of the acid was 84° to 85° C.

*Example XXXI*

The charge consisted of 1000 grams of water and 68 grams of silver catalyst. Ninety-three grams of 2-ethyl-3-methylglutaraldehyde having a purity of 92.7 percent (0.606 mol) was added continuously at a constant rate of 37 grams per hour. Concurrently 22 percent aqueous sodium hydroxide was added at such a rate that the mol ratio of sodium hydroxide to 2-ethyl-3-methylglutaraldehyde was 2.19 to 1 throughout the reaction period. The reaction temperature was maintained between 37° and 45° C. The filtered product solution weighed 1477 grams, including 200 grams of catalyst-wash water, and contained 126 grams (0.577 mol) of disodium 2-ethyl-3-methylglutarate, a yield of 95 percent, based on the aldehyde. The solution was acidified with a slight excess of sulfuric acid. The resulting homogeneous solution was extracted with ethylene glycol diethyl ether. The extract was distilled to remove the contained water and solvent. To the hot residue in the kettle was added a quantity of benzene from which 2-ethyl-3-methylglutaric acid slowly precipitated upon cooling. The solid acid was filtered and dried. In this manner, 75 grams of 2-ethyl-3-methylglutaric acid having a purity (acidity) of 97.6 percent (0.42 mol) was obtained. This amount of acid represented a yield of 69 percent based on the starting aldehyde. The melting point of the acid was 67° to 72° C.

*Example XXXII*

The charge consisted of 500 grams of water and 85 grams of silver catalyst. Two hundred and seven grams of freshly-distilled, anhydrous 2-ethylglutaraldehyde, having a purity of 96.9 percent (1.565 mols) was added continuously at a constant rate of 32 grams per hour. Concurrently 22 percent aqueous sodium hydroxide was added at such a rate that the mol ratio of sodium hydroxide to anhydrous 2-ethylglutaraldehyde was 2.1 to 1 throughout the oxidation. The reaction temperature was maintained between 45° and 50° C. The filtered product, an aqueous solution of disodium 2-ethylglutarate, weighed 1861 grams, including 600 grams of catalyst-wash water. The solution was washed with diisopropyl ether, and then was acidified with a stoichiometric quantity of concentrated sulfuric acid. The acidified solution was extracted several times with diisopropyl ether. The ether extracts which were thus obtained were combine and diisopropyl ether was removed by stripping under reduced pressure at a kettle temperature less than 50° C. Crude 2-ethylglutaric acid remained as a syrupy residue, which crystallized upon standing. This crude acid melted at 44° to 47° C. Recrystallization from a mixture of benzene and petroleum ether gave refined acid with a melting point of 56° to 59° C. The crude 2-ethylglutaric acid weighed 239 grams and had a purity (acidity) of 94.1 percent (1.404 mols), representing a 90 percent yield based on the aldehyde. The purity of the recrystallized acid was 98 percent (acidity).

CYCLOALIPHATIC ALDEHYDES. — EXAMPLES XXXIII–XXXVII

*Example XXXIII*

The charge consisted of 1500 grams of water and 105 grams of silver catalyst. Four hundred and thirty-four grams of $\Delta^3$-tetrahydrobenzaldehyde having a purity of 96.9 percent (3.82 mols) was added continuosly at a constant rate of 73 grams per hour. Concurrently 28 percent aqueous sodium hydroxide was added at such a rate that the mol ratio of sodium hydroxide to $\Delta^3$-tetrahydrobenzaldehyde was 1.09 to 1 throughout the reaction period. The reaction temperature was maintained between 35° and 40° C. The filtered product solution weighed 2632 grams, including 200 grams of catalyst-wash water, and contained 550 grams (3.71 mols) of sodium $\Delta^3$-tetrahydrobenzoate, a yield of 97 percent. A 500 gram aliquot of the filtered solution of sodium $\Delta^3$-tetrahydrobenzoate was steam-distilled to remove the steam-volatile impurities, and was then acidified with a slight excess of sulfuric acid. The lower aqueous layer was steam-distilled to recover the contained $\Delta^3$-tetrahydrobenzoic acid and the oily upper acid layer from the acidification was combined with the acid recovered by the steam-distillation of the aqueous layer. The crude acid weighed 94 grams and had a purity (acidity) of 91.0 percent (0.678 mol). The yield of crude acid based on the aldehyde was 93 percent. The crude acid was refined by distillation with a recovery greater than 90 percent. The refined $\Delta^3$-tetrahydrobenzoic acid distilled at a vapor temperature of 119° C. at 10 millimeters of mercury, and had a purity (acidity) of 98.6 percent, and a specific gravity of 1.079 at 26/15.6° C.

*Example XXXIV*

The charge consisted of 1500 grams of water and 150 grams of silver catalyst. Eight hundred and seventy-two grams of $\Delta^3$-tetrahydro-ortho-tolualdehyde (7.02 mols) was added continuously at a constant rate of 116 grams per hour. Concurrently 25 percent aqueous sodium hydroxide was added at such a rate that the mol ratio of sodium hydroxide to $\Delta^3$-tetrahydro-ortho-tolualdehyde was 1.05 to 1 throughout the reaction period. The reaction temperature was maintained between 36° and 41° C. The filtered product solution weighed 3608 grams, including 100 grams of catalyst-wash water, and contained 1070 grams (6.60 mols) of sodium $\Delta^3$-tetrahydro-ortho-toluate, a yield of 94 percent, based on the aldehyde. An aliquot of 500 grams of the solution was processed as in Example XXXIII. Crude $\Delta^3$-tetrahydro-ortho-toluic acid of 95.7 percent purity amounting to 131.5 grams (0.897 mol) was obtained as an oil layer. This amount of acid represented a yield of 92 percent, based on the aldehyde. The crude acid was refined by distillation at reduced pressure. The refined $\Delta^3$-tetrahydro-ortho-toluic acid of 99.0 percent purity (acidity) distilled at a vapor temperature of 125° C. at 10 millimeters of mercury. The refined acid represented an overall yield of 87 percent, based on the aldehyde. The specific gravity of the refined acid was 1.033 at 36/15.6° C.

*Example XXXV*

The charge consisted of 2000 grams of water and 123 grams of silver catalyst. Four hundred and seventy-two grams of acrolein dimer (2,3-dihydro-1, 4-pyran-2-carboxaldehyde) (4.21 mols), was added continuously at a constant rate of 47 grams per hour. Concurrently 30 percent aqueous sodium hydroxide was added at such a rate that the mol ratio of sodium hydroxide to acrolein dimer was 1.05 to 1. The reaction temperature was maintained between 36° and 45° C. The filtered product weighed 3207 grams, including 200 grams of catalyst-wash water, and contained 608 grams (4.05 mols) of sodium 2,3-dihydro-1, 4-pyran-2-carboxylate, a yield of 96 percent based on the starting aldehyde. The product solution was steam-distilled at atmospheric pressure to remove volatile impurities and was then acidified with a slight excess of sulfuric acid. The resulting homogeneous aqueous solution was extracted with ethylene glycol diethyl ether. The extract was distilled and the refined product was obtained at a vapor temperature of 70° C. at 5 millimeters of mercury. The refined product was a mixture of the free acid, 2,3-dihydro-1, 4-pyran-2-carboxylic acid, and its cyclization product, the lactone of 6-hydroxytetrahydropyran-2-carboxylic acid. Other properties were: purity by saponification, 100.5 percent; specific gravity, 1.218 at 33/15.6° C.

*Example XXXVI*

The charge consisted of 1500 grams of water and 103 grams of silver catalyst. Four hundred forty-four grams of methacrolein dimer (2,5-dimethyl-2,3-dihydro-1,4-pyran-2-carboxaldehyde) (3.17 mols), was added continuously at the rate of 59 grams per hour. Concurrently 24 percent aqueous sodium hydroxide was added at such a rate that the mol ratio of sodium hydroxide to methacrolein dimer was 1.04 to 1. The reaction temperature was maintained between 34° and 42° C. The filtered product weighed 2588 grams, including 200 grams of catalyst-wash water, and contained 490 grams (2.75 mols) of sodium 2,5-dimethyl-2,3-dihydro-1,4-pyran-2-carboxylate, a yield of 87 percent, based on the aldehyde. The product was acified with an excess of sulfuric acid. The resulting homogeneous solution was extracted with ethylene glycol diethyl ether. The extract was distilled. The refined product distilled at a vapor temperature of 61 to 64° C. at 2 millimeters of mercury and was a mixture of the free acid, 2,5-dimethyl-2,3-dihydro-1,4-pyran-2-carboxylic acid, and its cyclization product, the lactone of 6 - hydroxy - 2,5 - dimethyltetrahydropyran - 2 - carboxylic acid. Other properties were: purity by saponification, 100.3 percent; specific gravity, 1.106 at 30/15.6° C.; and refractive index, 1.4483 ($n$ 20/D).

*Example XXXVII*

The charge consisted of 500 grams of water and 30 grams of silver catalyst. Ninety-six grams of furfural (1.00 mol) was added continuously at a rate of 58 grams per hour. Concurrently 38 percent aqueous sodium hydroxide was added at such a rate that the mol ratio of sodium hydroxide to furfural was 1.1 to 1. The reaction temperature was maintained between 40° and 50° C. The filtered product weighed 877 grams, including 200 grams of catalyst-wash water, and contained 127.5 grams (0.951 mol) of sodium furoate, a yield of 95 percent based on the aldehyde. The product was acidified with a slight excess of sulfuric acid. Crude furoic acid, weighing 92 grams and having a purity of 97.2 percent, precipitated from solution and was recovered by filtration. An additional 18 grams of furoic acid was recovered from the remaining solution by extraction with diisopropyl ether. The total yield of acid was 96 percent based on the aldehyde. The crude acid was recrystallized from water to obtain pure furoic acid melting at 132° C. and having a purity of 99.3 percent by determination of acidity.

AROMATIC ALDEHYDES.—EXAMPLES XXXVIII–XLI

*Example XXXVIII*

The charge consisted of 500 grams of water and 30 grams of silver catalyst. One hundred and six grams of benzaldehyde (1.00 mol) was added continuously at a rate of 53 grams per hour. Concurrently 31 percent aqueous sodium hydroxide was added at such a rate that the mol ratio of sodium hydroxide to benzaldehyde was 1.1 to 1. The reaction temperature was maintained between 40° and 45° C. The filtered product weighed 911 grams, including 200 grams of catalyst-wash water, and contained 145 grams (1.01 mol) of sodium benzoate for a quantitative yield, based on the aldehyde. The product was acidified with a slight excess of sulfuric acid. Crude benzoic acid, weighing 128 grams and having a purity of 88.7 percent, precipitated from solution and was recovered by filtration. An additional 6 grams of benzoic acid was recovered from the remaining solution by extraction with diisopropyl ether. The yield of total acid was 98 percent based on the aldehyde. The crude acid was recrystallized from water to obtain pure benzoic acid melting at 122° C. and having a purity of 99.0 percent by acidity.

*Example XXXIX*

The charge consisted of 500 grams of water and 35 grams of silver catalyst. One hundred and twenty-two grams of salicylaldehyde (1.00 mol) was added continuously at a rate of 43 grams per hour. Concurrently 31 percent aqueous sodium hydroxide was added at such a rate that the mol ratio of sodium hydroxide to salicylaldehyde was 2.1 to 1. The reaction temperature was maintained between 40° and 48° C. The filtered product, an aqueous solution of sodium salicylate, was acidified with a slight excess of sulfuric acid. Crude salicyclic acid, weighing 134 grams and having a purity of 94.0 percent, precipitated from solution and was recovered by filtration. An additional 2.4 grams of salicylic acid was recovered by extraction with diisopropyl ether. The yield of total acid was 93 percent based on the aldehyde. The crude acid was recrystallized from water to obtain refined salicylic acid melting at 159° C. and having a purity of 99.2 percent.

*Example XL*

The charge consisted of 1100 grams of water and 36 grams of silver catalyst. One hundred and thirty-two grams of cinnamaldehyde (1.00 mol) was added continuously at a rate of 53 grams per hour. Concurrently 28 percent aqueous sodium hydroxide was added at such a rate that the mol ratio of sodium hydroxide to cinnamaldehyde was 1.08 to 1. The reaction temperature was maintained between 39° and 45° C. The filtered product contained 166.5 grams (0.979 mol) of sodium cinnamate, a yield of 98 percent based on the aldehyde. The product was acidified with a slight excess of sulfuric acid. Crude cinnamic acid, weighing 170 grams and having a purity of 84.6 percent, precipitated from solution and was recovered by filtration. The yield of crude acid was 97 percent based on the aldehyde. The crude acid was recrystallized from a mixture of water and methanol to obtain 135 grams (91 percent yield based on the aldehyde) of refined cinnamic acid melting at 135° C. and having a purity of 99.3 percent by acidity.

*Example XLI*

The charge consisted of 600 grams of water and 36 grams of silver catalyst. One hundred and forty and one-half grams of p-chlorobenzaldehyde (1.00 mol) was added continuously at a rate of 47 grams per hour. Concurrently 28 percent aqueous sodium hydroxide was added at such a rate that the mol ratio of sodium hydroxide to p-chlorobenzaldehyde was 1.08 to 1. The reaction temperature was maintained between 43° and 47° C. The filtered product contained 146 grams (0.82 mol) of sodium p-chlorobenzoate, a yield of 82 percent based on the aldehyde. The product was acidified with a slight excess of sulfuric acid. Crude p-chlorobenzoic acid, weighing 223 grams and having a purity of 56.2 percent, precipitated from solution and was recovered by filtration. The yield of acid was 80 percent based on the aldehyde. The crude acid was recrystallized from methanol to obtain refined p-chlorobenzoic acid melting at 236° C. and having a purity of 98.4 percent by acidity.

We claim:

1. A process for oxidizing an aldehyde which comprises simultaneously introducing said aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide at least one chemical equivalent of said alkali for each equivalent of said aldehyde; maintaining the pH of said mixture at at least 12.5 and concurrently passing molecular oxygen through said mixture, obtaining thereby as product the salt of the acid corresponding to said aldehyde.

2. A process for oxidizing an aldehyde which comprises simultaneously introducing said aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide from one to two chemical equivalents of said alkali for each equivalent of said aldehyde; maintaining the pH of said mixture at at least 12.5 and concurrently passing molecular oxygen through said mixture, obtaining thereby as product the salt of the acid corresponding to said aldehyde.

3. A process for oxidizing an aldehyde which comprises simultaneously introducing said aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide from one to 1.2 chemical equivalents of said alkali for each equivalent of said aldehyde; maintaining the pH of said mixture at at least 12.5 and concurrently passing molecular oxygen through said mixture, obtaining thereby as product the salt of the acid corresponding to said aldehyde.

4. A process for oxidizing a saturated aliphatic aldehyde which comprises simultaneously introducing said aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide at least one chemical equivalent of said alkali for each equivalent of said aldehyde; maintaining the pH of said mixture at at least 12.5 and concurrently passing molecular oxygen through said mixture, obtaining thereby as product the salt of the acid corresponding to said aldehyde.

5. A process for oxidizing an unsaturated aliphatic aldehyde which comprises simultaneously introducing said aldehyde and an aqueous solution of a strong alkali in separate streams, into a reaction vessel containing an aqueous suspension of a metallic silver catalyst to form a reaction mixture, said alkali being introduced in such quantity realtive to said aldehyde as to provide at least one chemical equivalent of said alkali for each equivalent of said aldehyde; maintaining the pH of said mixture at at least 12.5 and concurrently passing molecular oxygen through said mixture, obtaining thereby as product the salt of the acid corresponding to said aldehyde.

6. A process for oxidizing a saturated dialdehyde which comprises simultaneously introducing said aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide at least one chemical equivalent of said alkali for each equivalent of said aldehyde; maintaining the pH of said mixture at at least 12.5 and concurrently passing molecular oxygen through said mixture, obtaining thereby as product the salt of the acid corresponding to said aldehyde.

7. A process for oxidizing a cycloaliphatic aldehyde which comprises simultaneously introducing said aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide at least one chemical equivalent of said alkali for each equivalent of said aldehyde; maintaining the pH of said mixture at at least 12.5 and concurrently passing molecular oxygen through said mixture, obtaining thereby as product the salt of the acid corresponding to said aldehyde.

8. A process for oxidizing an aromatic aldehyde which comprises simultaneously introducing said aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide at least one chemical equivalent of said alkali for each equivalent of said aldehyde; maintaining the pH of said mixture at at least 12.5 and concurrently passing molecular oxygen through said mixture, obtaining thereby as product the salt of the acid corresponding to said aldehyde.

9. A process for oxidizing an aldehyde which comprises simultaneously introducing said aldehyde and an aqueous solution of sodium hydroxide in separate streams, into a reaction vessel containing an aqueous suspension of a metallic silver catalyst to form a reaction mixture, said sodium hydroxide being introduced in such quantity relative to said aldehyde as to provide at least one chemical equivalent of said sodium hydroxide for each equivalent of said aldehyde; maintaining the pH of said mixture at at least 12.5 and concurrently passing molecular oxygen through said mixture, obtaining thereby as product the sodium salt of the acid corresponding to said aldehyde.

10. A process for oxidizing an aldehyde which comprises simultaneously introducing said aldehyde and an aqueous solution of barium hydroxide in separate streams, into a reaction vessel containing an aqueous suspension of a metallic silver catalyst to form a reaction mixture, said barium hydroxide being introduced in such quantity relative to said aldehyde as to provide at least one chemical equivalent of said barium hydroxide for each equivalent of said aldehyde; maintaining the pH of said mixture at at least 12.5 and concurrently passing molecular oxygen through said mixture, obtaining thereby as product the barium salt of the acid corresponding to said aldehyde.

11. A process for oxidizing a aldehyde which comprises simultaneously introducing said aldehyde and an aqueous solution of potassium hydroxide in separate streams, into a reaction vessel containing an aqueous suspension of a metallic silver catalyst to form a reaction mixture, said potassium hydroxide being introduced in such quantity relative to said aldehyde as to provide at least one chemical equivalent of said potassium hydroxide for each equivalent of said aldehyde; maintaining the pH of said mixture at at least 12.5 and concurrently passing molecular oxygen through said mixture, obtaining thereby as product the potassium salt of the acid corresponding to said aldehyde.

12. A process for oxidizing an aldehyde which comprises simultaneously introducing said aldehyde and an aqueous solution of lithium hydroxide in separate streams, into a reaction vessel containing an aqueous suspension of a metallic silver catalyst to form a reaction mixture, said lithium hydroxide being introduced in such quantity relative to said aldehyde as to provide at least one chemical equivalent of said lithium hydroxide for each equivalent of said aldehyde; maintaining the pH of said mixture at at least 12.5 and concurrently passing molecular oxygen through said mixture, obtaining thereby as product the lithium salt of the acid corresponding to said aldehyde.

13. A process for oxidizing 2,4-hexadienal which comprises simultaneously introducing 2,4-hexadienal and an aqueous solution of sodium hydroxide in separate streams, into a reaction vessel containing an aqueous suspension of a metallic silver catalyst to form a reaction mixture, said sodium hydroxide being introduced in such quantity relative to said 2,4-hexadienal as to provide at least one mol of said sodium hydroxide for each mol of said 2,4-hexadienal; maintaining the pH of said mixture at at least 12.5 and concurrently passing molecular oxygen through said mixture, obtaining thereby as product sodium sorbate.

14. A process for oxidizing acrolein which comprises simultaneously introducing acrolein and an aqueous solution of sodium hydroxide in separate streams, into a reaction vessel containing an aqueous suspension of a metallic silver catalyst to form a reaction mixture, said sodium hydroxide being introduced in such quantity relative to said acrolein as to provide at least one mol of said sodium hydroxide for each mol of said acrolein; maintaining the pH of said mixture at at least 12.5 and concurrently passing molecular oxygen through said mixture, obtaining thereby as product sodium acrylate.

15. A process for oxidizing glutaraldehyde which comprises simultaneously introducing glutaraldehyde and an aqueous solution of sodium hydroxide in separate streams, into a reaction vessel containing an aqueous suspension of a metallic silver catalyst to form a reaction mixture, said sodium hydroxide being introduced in such quantity relative to said glutaraldehyde as to provide at least two mols of said sodium hydroxide for each mol of said glutaraldehyde; maintaining the pH of said mixture at at least 12.5 and concurrently passing molecular oxygen through said mixture, obtaining thereby as product sodium glutarate.

16. A process for oxidizing $\Delta^3$-tetrahydrobenzaldehyde which comprises simultaneously introducing $\Delta^3$-tetrahydrobenzaldehyde and an aqueous solution of sodium hydroxide in separate streams, into a reaction vessel containing an aqueous suspension of a metallic silver catalyst to form a reaction mixture, said sodium hydroxide being introduced in such quantity relative to said Δ³-tetrahydrobenzaldehyde as to provide at least one mol of said sodium hydroxide for each mol of said Δ³-tetrahydrobenzaldehyde; maintaining the pH of said mixture at at least 12.5 and concurrently passing molecular oxygen through said mixture, obtaining thereby as product sodium Δ³-tetrahydrobenzoate.

17. A process for oxidizing acrolein dimer which comprises simultaneously introducing acrolein dimer and an aqueous solution of sodium hydroxide in separate streams, into a reaction vessel containing an aqueous suspension of a metallic silver catalyst to form a reaction mixture, said sodium hydroxide being introduced in such quantity relative to said acrolein dimer as to provide at least one mol of said sodium hydroxide for each mol of said acrolein dimer; maintaining the pH of said mixture at at least 12.5 and concurrently passing molecular oxygen through said mixture, obtaining thereby as product sodium 2,3-dihydro-1,4-pyran-2-carboxylate.

18. A process for producing an organic carboxylic acid which comprises simultaneously introducing an aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide at least one chemical equivalent of said alkali for each equivalent of said aldehyde; maintaining the pH of said mixture at at least 12.5 and concurrently passing molecular oxygen through said mixture to form the alkaline salt of said organic acid, liberating said organic acid from said salt, and recovering said acid.

19. A process for producing an organic carboxylic acid which comprises simultaneously introducing an aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide from one to 1.2 chemical equivalents of said alkali for each equivalent of said aldehyde; maintaining the pH of said mixture at at least 12.5 and concurrently passing molecular oxygen through said mixture to form the alkaline salt of said organic acid, liberating said organic acid from said salt, and recovering said acid.

20. A process for producing a saturated aliphatic acid which comprises simultaneously introducing a saturated aliphatic aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide from one to 1.2 chemical equivalents of said alkali for each equivalent of said aldehyde; maintaining the pH of said mixture at at least 12.5 and concurrently passing molecular oxygen through said mixture to form the alkaline salt of said saturated aliphatic acid, liberating said saturated aliphatic acid from said salt, and recovering said acid.

21. A process for producing an unsaturated aliphatic acid which comprises simultaneously introducing an unsaturated aliphatic aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide from one to 1.2 chemical equivalents of said alkali for each equivalent of said aldehyde; maintaining the pH of said mixture at at least 12.5 and concurrently passing molecular oxygen through said mixture to form the alkaline salt of said unsaturated aliphatic acid, liberating said unsaturated aliphatic acid from said salt, and recovering said acid.

22. A process for producing a saturated aliphatic dicarboxylic acid which comprises simultaneously introducing a saturated aliphatic dialdehyde and an aqueous solution of a strong alkali in separate streams, into a reaction vessel containing an aqueous suspension of a metallic silver catalyst to form a reaction mixture, said alkali being introduced in such quantity relative to said aldehyde as to provide from one to 1.2 chemical equivalents of said alkali for each equivalent of said aldehyde; maintaining the pH of said mixture at at least 12.5 and concurrently passing molecular oxygen through said mixture to form the alkaline salt of said saturated aliphatic dicarboxylic acid, liberating said saturated aliphatic dicarboxylic acid from said salt, and recovering said acid.

23. A process for producing an cycloaliphatic acid which comprises simultaneously introducing an cycloaliphatic aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide from one to 1.2 chemical equivalents of said alkali for each equivalent of said aldehyde; maintaining the pH of said mixture at at least 12.5 and concurrently passing molecular oxygen through said mixture to form the alkaline salt of said cycloaliphatic acid, liberating said cycloaliphatic acid from said salt, and recovering said acid.

24. A process for producing an aromatic acid which comprises simultaneously introducing an aromatic aldehyde and an aqueous solution of a strong alkali in separate streams, into a reaction vessel containing an aqueous suspension of a metallic silver catalyst to form a reaction mixture, said alkali being introduced in such quantity relative to said aldehyde as to provide from one to 1.2 chemical equivalents of said alkali for each equivalent of said aldehyde; maintaining the pH of said mixture at at least 12.5 and concurrently passing molecular oxygen through said mixture to form the alkaline salt of said aromatic acid, liberating said aromatic acid from said salt, and recovering said acid.

25. A process for producing sorbic acid which comprises simultaneously introducing 2,4-hexadienal and an aqueous solution of sodium hydroxide in separate streams, into a reaction vessel containing an aqueous suspension of a metallic silver catalyst to form a reaction mixture, said sodium hydroxide being introduced in such quantity relative to said 2,4-hexadienal as to provide from one to 1.2 mols of said sodium hydroxide for each mol of said 2,4-hexadienal; maintaining the pH of said mixture at at least 12.5 and concurrently passing molecular oxygen through said mixture to form sodium sorbate, liberating said sorbic acid from said sodium sorbate, and recovering said sorbic acid.

26. A process for producing acrylic acid which comprises simultaneously introducing acrolein and an aqueous solution of sodium hydroxide in separate streams, into a reaction vessel containing an aqueous suspension of a metallic silver catalyst to form a reaction mixture, said sodium hydroxide being introduced in such quantity relative to said acrolein as to provide from one to 1.2 mols of said sodium hydroxide for each mol of said acrolein; maintaining the pH of said mixture at at least 12.5 and concurrently passing molecular oxygen through said mixture to form sodium acrylate, liberating said acrylic acid from said sodium acrylate, and recovering said acrylic acid.

27. A process for producing glutaric acid which comprises simultaneously introducing glutaraldehyde and an aqueous solution of sodium hydroxide in separate streams, into a reaction vessel containing an aqueous suspension of a metallic silver catalyst to form a reaction mixture, said sodium hydroxide being introduced in such quantity relative to said glutaraldehyde as to provide from one to 1.2 chemical equivalents of said sodium hydroxide for each chemical equivalent of said glutaraldehyde; maintaining the pH of said mixture at at least 12.5 and concurrently passing molecular oxygen through said mixture to form disodium glutarate, liberating said glutaric acid from said disodium glutarate, and recovering said glutaric acid.

28. A process for producing Δ³-tetrahydrobenzoic acid which comprises simultaneously introducing Δ³-tetrahydrobenzaldehyde and an aqueous solution of sodium hydroxide in separate streams, into a reaction vessel containing an aqueous suspension of a metallic silver catalyst to form a reaction mixture, said sodium hydroxide being introduced in such quantity relative to said Δ³-tetrahydrobenzaldehyde as to provide from one to 1.2 mols of said sodium hydroxide for each mol of said Δ³-tetrahydrobenzaldehyde; maintaining the pH of said mixture at at least 12.5 and concurrently passing molecular oxygen through said mixture to form sodium Δ³-tetrahydrobenzoate, liberating said Δ³-tetrahydrobenzoic acid from said sodium Δ³-tetrahydrobenzoate, and recovering said Δ³-tetrahydrobenzoic acid.

29. A process for producing 2,3-dihydro-1,4-pyran-2-carboxylic acid which comprises simultaneously introducing acrolein dimer and an aqueous solution of sodium hydroxide in separate streams, into a reaction vessel containing an aqueous suspension of a metallic silver catalyst to form a reaction mixture, said sodium hydroxide being introduced in such quantity relative to said acrolein dimer as to provide from one to 1.2 mols of said sodium hydroxide for each mol of said acrolein dimer; maintaining the pH of said mixture at at least 12.5 and concurrently passing molecular oxygen through said mixture to form sodium 2,3-dihydro-1,4-pyran-2-carboxylate, liberating said 2,3-dihydro-1,4-pyran-2-carboxylic acid from said sodium 2,3-dihydro-1,4-pyran-2-carboxylate, and recovering said 2,3-dihydro-1,4-pyran-2-carboxylic acid.

30. A process for the manufacture of an alkali metal acrylate, which comprises introducing, at a temperature below 20° C., acrolein and elemental oxygen into an aqueous solution of a basic alkali metal compound, said last named solution being maintained at a pH in excess of 12.5 and containing a silver oxide catalyst.

References Cited in the file of this patent

UNITED STATES PATENTS

| | | |
|---|---|---|
| 2,041,184 | Isenhour | May 19, 1936 |
| 2,288,566 | Herstein | June 30, 1942 |
| 2,407,066 | Dunlop | Sept. 3, 1946 |
| 2,419,158 | Pearl | April 15, 1947 |
| 2,446,606 | Pearl | Aug. 10, 1948 |
| 2,514,156 | Geyer et al. | July 4, 1950 |

FOREIGN PATENTS

| | | |
|---|---|---|
| 118,461 | Sweden | April 1, 1947 |

OTHER REFERENCES

Delepine et al.: Bull. Soc. Chim. [4] 5, pp. 879–884 (1909).

Baumgarten et al.: Berichte, vol. 59, pp. 2663 (1926).

UNITED STATES PATENT OFFICE

CERTIFICATE OF CORRECTION

Patent No. 2,930,801                      March 29, 1960

Amelio E. Montagna et al.

It is hereby certified that error appears in the printed specification of the above numbered patent requiring correction and that the said Letters Patent should read as corrected below.

Column 2, line 31, for "of" read -- or --; line 48, for "eup" read -- up --; column 4, line 48, after "to" insert -- a --; column 14, line 4, in the heading, for "EXAMPLES XXIX-XXXXII" read -- EXAMPLES XXIX-XXXII --; line 52, for "cooled 3-meth-" read -- cooled. 3-Meth- --; column 15, line 31, for "combine" read -- combined --; column 19, line 17, for "realtive" read -- relative --.

Signed and sealed this 25th day of April 1961.

(SEAL)
Attest:

ERNEST W. SWIDER                        DAVID L. LADD

Attesting Officer                          Commissioner of Patents